United States Patent
Chu et al.

(10) Patent No.: US 6,957,844 B2
(45) Date of Patent: Oct. 25, 2005

(54) MOUNTING PLATE FOR VEHICLE DOOR REINFORCEMENT MEMBERS

(75) Inventors: Yi-Hwa Chu, Ouzouer sur Loire (FR); Jean-Marc Belmond, St. Jean le Blanc (FR); Pascal De Vries, Sandillon (FR)

(73) Assignee: ArvinMeritor Light Vehicle Systems—France, Sully-sur-Loire (FR)

( * ) Notice: Subject to any disclaimer, the term of this patent is extended or adjusted under 35 U.S.C. 154(b) by 187 days.

(21) Appl. No.: 10/692,302

(22) Filed: Oct. 23, 2003

(65) Prior Publication Data

US 2004/0130180 A1    Jul. 8, 2004

(30) Foreign Application Priority Data

Nov. 12, 2002   (FR) .................................. 02 14110

(51) Int. Cl.[7] .............................................. B60J 5/00
(52) U.S. Cl. ............................... 296/146.6; 296/187.12
(58) Field of Search ......................... 296/146.6, 187.12

(56) References Cited

U.S. PATENT DOCUMENTS

| | | | | |
|---|---|---|---|---|
| 4,090,734 A | * | 5/1978 | Inami et al. ............. | 296/146.6 |
| 5,417,470 A | * | 5/1995 | Holt ...................... | 296/187.12 |
| 5,429,410 A | | 7/1995 | Fleischer | |
| 5,470,125 A | * | 11/1995 | Yamazaki ................ | 296/146.6 |
| 5,544,930 A | | 8/1996 | Stedman | |
| 5,599,057 A | * | 2/1997 | Hirahara et al. .......... | 296/146.6 |
| 5,868,456 A | * | 2/1999 | Kowalski et al. ......... | 296/146.6 |
| 6,290,282 B1 | | 9/2001 | Sandberg et al. | |
| 6,575,525 B2 | * | 6/2003 | Traister et al. ........... | 296/146.6 |

FOREIGN PATENT DOCUMENTS

GB          2101535         * 1/1983

OTHER PUBLICATIONS

French Search Report Dated Jun. 19, 2003.

* cited by examiner

Primary Examiner—Dennis H. Pedder
(74) Attorney, Agent, or Firm—Carlson, Gaskey & Olds

(57) ABSTRACT

A mounting plate for an anti-intrusion reinforcement member includes securing features that secure the plate to a vehicle door. The mounting plate also includes a plurality of mounting interfaces for the reinforcement member. The plate can be fitted to different mounting points in the door and to different reinforcement members, simplifying the production of the mounting plate. An anti-intrusion assembly including the plate, and a door with the assembly are also provided.

20 Claims, 1 Drawing Sheet

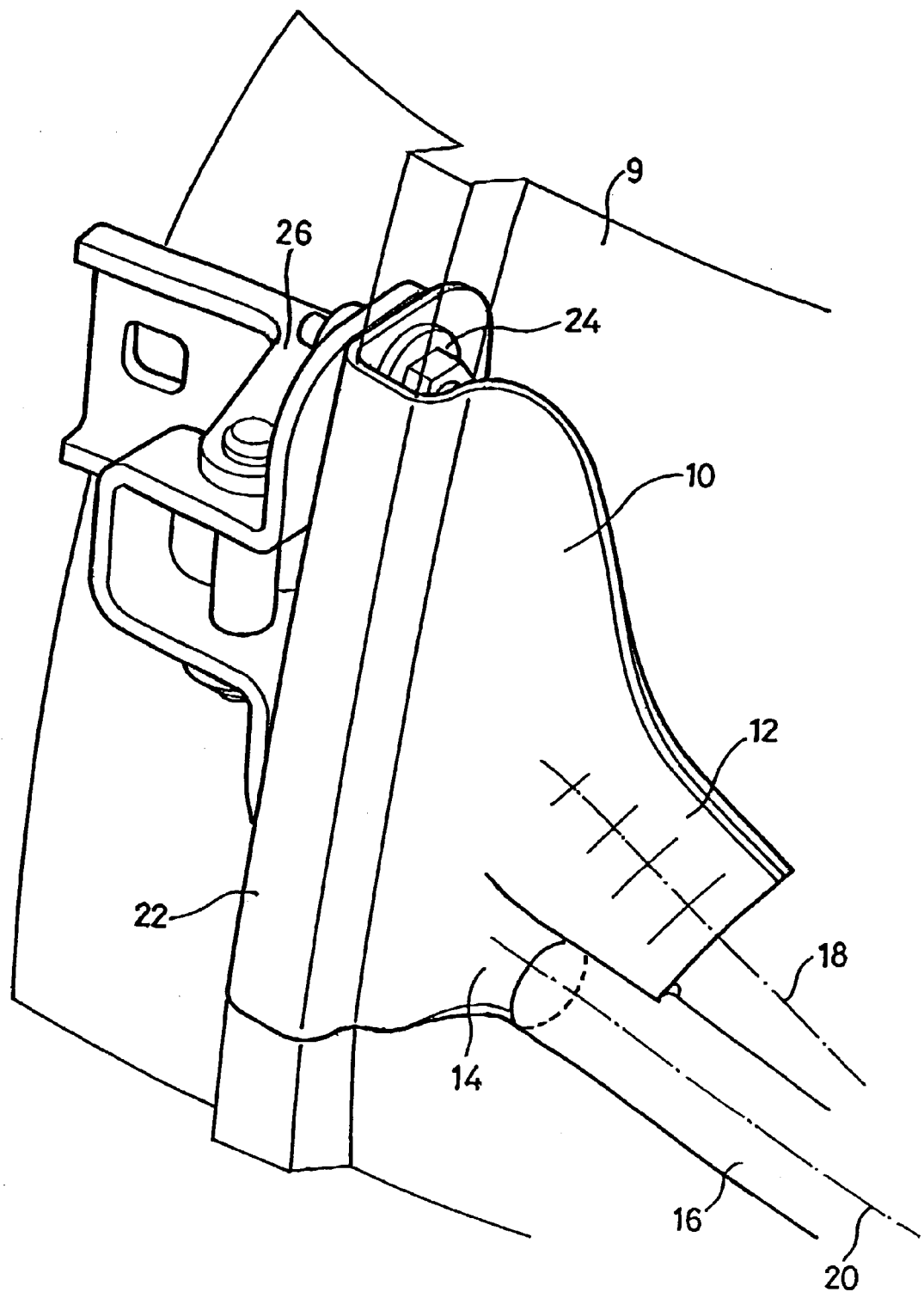

MOUNTING PLATE FOR VEHICLE DOOR REINFORCEMENT MEMBERS

REFERENCE TO RELATED APPLICATIONS

This application claims priority to French Patent Application FR 02 14 110 filed Nov. 12, 2002.

TECHNICAL FIELD

This invention relates generally to a mounting plate that fixes a reinforcement member in different orientations in a vehicle door to protect vehicle occupants from a side impact.

BACKGROUND OF THE INVENTION

Vehicle doors are fitted with assemblies that reinforce the structure of the door against side impacts. U.S. Pat. No. 6,135,537 discloses a reinforced vehicle door assembly that transfers the energy of a side impact to the chassis of a vehicle through the door hinge. The assembly includes two anti-intrusion bars across the door. One end of the bar is connected to the hinge, and the other end of the bar is connected to the door frame by a mounting plate.

One drawback to this assembly is that the two ends of the anti-intrusion bars are fixed by different components.

Thus, there is a need to simplify the production of the mounting component for anti-intrusion reinforcement members in vehicle doors.

SUMMARY OF THE INVENTION

The present invention is directed to a mounting plate for an anti-intrusion reinforcement member. The mounting plates includes securing features that secure the plate to a vehicle door and a plurality of mounting interfaces for the reinforcement member. A door hinge can also be fixed to the mounting plate.

In one embodiment, the mounting interfaces have different orientations. The interfaces can also be channels that are inclined relative to each other.

The present invention also provides an anti-intrusion assembly including the reinforcement member and the mounting plate, a door including the assembly, or a vehicle including a plurality of doors. The assembly can include two mounting plates. In one example, one of the doors is a front door and another is a rear door.

These and other features of the present invention will be best understood from the following specification and drawings.

BRIEF DESCRIPTION OF THE DRAWING

Other characteristics and advantages of the invention are given in the following detailed description of the embodiments of the invention, given by way of example only and with reference to the drawing.

FIG. 1 shows a mounting plate according to one embodiment of the present invention.

DETAILED DESCRIPTION OF PREFERRED EMBODIMENT

FIG. 1 illustrates the anti-intrusion reinforcement member mounting plate 10 of the present invention. The plate 10 includes securing features 22 and 24 to secure the plate 10 to a vehicle door. The plate 10 also includes a plurality of reinforcement member mounting interfaces 12 and 14 for a reinforcement member 16, allowing one type of plate 10 to be fitted to different fixing points in the door and to different reinforcement members 16. Regardless of the position of the reinforcement members 16 in the door, the reinforcement members 16 can be fixed to the door with the plate 10, simplifying production of the mounting interfaces 12 and 14. The plate 10 can also be fitted to different types of doors, depending on the door length.

The reinforcement member 16 is fixed to a vehicle door panel 9 using the plate 10. In one example, the panel 9 is an inner door panel joined to an outer panel (not shown) to form the door.

Vehicle doors are being made increasingly lighter by reducing the thickness of the bodywork and by decreasing the size of the door structure. A drawback to making doors lighter is that the impact resistance of the door decreases. The reinforcement member 16 lines the door, increasing the door strength and providing greater resistance than the bodywork in the event of an impact. The reinforcing member 16 extends in a zone of the door that could potentially injure the vehicle's occupants in the event of a side impact. The reinforcing member 16 reinforces the door without adding excessive bulk or weight to protect the vehicle's occupants and limit the intrusion of the door into the vehicle passenger compartment in the event of a side impact.

The reinforcement member 16 extends across the longitudinal direction of the vehicle from one side of the door to the other. The longitudinal reinforcement member 16 may extend approximately in the longitudinal direction of the vehicle and level with the occupants' pelvises. Alternately, the reinforcement member 16 can be inclined relative to the longitudinal direction to cover different impact heights in the door.

The reinforcement member 16 also has flexural strength. The reinforcement member 16 is a section where the highest inertia is in a side impact direction. In one example, the reinforcement member 16 is a beam having a circular cross-section. Preferably, the reinforcement member 16 is made of metal. The reinforcement member 16 is less bulky and simple to produce.

Securing features 22 and 24 fix the reinforcement members 16 to the vehicle door 9. The securing feature 22 includes a mounting plate. Preferably, the mounting plate is integral with the mounting interfaces 12 and 14, facilitating production of the mounting plate. The shape of the mounting plate depends on the mounting point of the mounting plate to the door 9.

The mounting plate is fixed to a ridge on the door panel 9. The mounting plate has a U-shaped cross-section that follows the shape of the ridge on the door panel 9. The securing feature 24 also includes securing devices to fix the mounting plate to the door panel 9. In one example, the securing devices are bolts. However, it is to be understood that other fixing methods, such as welding, can be utilized.

The mounting plate 22 may be a reinforcing plate for a hinge 26 on the door. The reinforcing member 16 can be secured to the vehicle chassis by fixing the hinge 26 to the mounting plate 22, improving the safety of the vehicle occupants by limiting intrusion of the reinforcement members 16 into the passenger compartment in the event of a side impact.

The mounting interfaces 12 and 14 fix the reinforcement member 16 to the door 9 and provide the link between the reinforcement members 16 and the door 9. The mounting interfaces 12 and 14 receive and immobilize the reinforcement member 16. In one example, the reinforcing member 16 is secured to the mounting interfaces 12 and 14 by welding. However, it is to be understood that the reinforcing member 16 can be secured to the mounting interfaces 12 and 14 by any method.

Preferably, the mounting interfaces 12, 14 have different orientations. In one example, the mounting interfaces 12 and 14 extend along the longitudinal axes 18 and 20, respectively. The axes 18 and 20 have different orientations and are inclined relative to each other. Therefore, the plate 10 can be fixed to different points on the door 9, and the reinforcement member 16 can be fixed to one of the mounting interfaces 12 and 14. That is, one type of plate 10 can provide several reinforcement member mounting positions.

The different orientations of the longitudinal axes 18 and 20 allow the reinforcement members 16 to be inclined to a greater or lesser extent relative to the longitudinal direction of the vehicle. If the reinforcement member 16 is inclined a great deal relative to the longitudinal direction of the vehicle, it may be approximately diagonal to the part of the door 9 located underneath the window. If the reinforcing member 16 is only slightly inclined relative to the longitudinal direction of the vehicle, the reinforcement member 16 is placed level with the pelvises of the vehicle's occupants.

In one embodiment, the mounting interfaces 12 and 14 are channels having the longitudinal axis 18 and 20, respectively. The channels have an elongated shape in this example to allow insertion of the reinforcement member 16. The mounting interfaces 12 and 14 are utilized to immobilize the reinforcement member 16 perpendicular to its longitudinal axis 18 and 20, respectively, improving the fixing of the reinforcement member 16 to the door 9. The reinforcement member 16 may also be immobilized in the other directions by welding. The longitudinal axes 18 and 20 are inclined relative to each other so that they can retain the reinforcement members 16 in different orientations. If the reinforcement member 16 is a beam having a circular cross-section, the mounting interfaces 12 and 14 can have a rounded bottom to improve retention of the reinforcement member 16.

The present invention also relates to an assembly including an anti-intrusion reinforcement member 16 and a reinforcement member mounting plate 10. The assembly can be fitted in several positions in the door 9 because it has a plurality of mounting interfaces 12 and 14. The assembly can also include several mounting plates 10. For example, a reinforcement member 16 having a longitudinal shape may be fixed at each end to the door by a plate 10. The same type of plate 10 may be used for mounting the reinforcement member 16 because the plates 10 have several mounting interfaces 12 and 14, reducing the number of types of plates 10 to be produced.

The invention also relates to a door 9 including the assembly described above. The advantages described above also apply to the door 9. Moreover, the door 9 may have a plurality of assemblies that arrange the reinforcement members 16 in different directions and at different heights to increase protection of the vehicle's occupants. The different assemblies advantageously use the same type of plate 10 for mounting the different reinforcement members 16, and the same plate 10 can be used at different reinforcement member 16 fixing points. The plate 10 is compatible with the different orientations of the reinforcement members 16 in the door 9.

The invention also relates to a vehicle including a door 9 as described above. The advantages described above also apply to the vehicle itself. Moreover, the vehicle may have a plurality of doors 9 containing the assembly. For example, one door is a front door and another door is a rear door. The doors may not have the same dimension in the longitudinal direction of the vehicle, which may influence the orientation of reinforcement members 16 in the doors. In this case, the plate 10 is used to adapt to these different orientations. The plate 10 allows the reinforcement members 16 to be fixed equally successfully in the front and the rear doors. Therefore, only one type of plate 10 can be produced for a vehicle, simplifying the production of the vehicle.

Of course, this invention is not limited to the embodiments described by way of example. Thus, the number of interfaces on a plate 10 is not limited to the two shown in FIG. 1. Moreover, the invention also applies to three-door vehicles, as the plate 10 can be fixed in the vehicle bodywork level with the rear passengers.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mounting plate for mounting an anti-intrusion reinforcement member securable to a vehicle door, the mounting plate comprising:
   a securing feature to secure the mounting plate to the vehicle door; and
   a plurality of mutually inclined contoured mounting interfaces for the reinforcement member, wherein the reinforcement member is mountable to the mounting plate in a plurality of positions.

2. The plate according to claim 1, wherein the plurality of mounting interfaces include a first mounting interface having a first axis and a second mounting interface having a second axis different from the first axis.

3. The plate according to claim 2, wherein the first mounting interface defines a first channel and the second mounting interface defines a second channel.

4. The plate according to claim 3, wherein the first channel is inclined relative to the second channel.

5. An anti-intrusion assembly comprising:
   a reinforcement member; and
   a mounting plate securable to a vehicle door, the mounting plate including a securing feature to secure the mounting plate to the vehicle door and a plurality of mutually inclined contoured mounting interfaces to receive the reinforcement member, wherein the reinforcement member is mountable to the mounting plate in a plurality of positions.

6. The assembly according to claim 5, wherein the assembly includes two mounting plates.

7. The assembly according to claim 5, wherein the reinforcement member is metal.

8. The assembly according to claim 5, wherein the securing feature includes an attachment member, and the mounting plate is secured to the vehicle door by the attachment member.

9. The assembly according to claim 8, wherein the attachment member is a bolt.

10. The assembly according to claim 5, wherein the securing feature is formed in one-piece with the plurality of mounting interfaces.

11. The assembly according to claim 8, wherein the securing feature is secured to the vehicle door by the attachment member.

12. The assembly according to claim 5, wherein the securing feature has a substantially U-shaped cross-section.

13. The assembly according to claim 5, wherein the securing feature is secured to a hinge of the vehicle door.

14. The assembly according to claim 5, wherein the plurality of mounting interfaces include a first mounting interface having a first axis and a second mounting interface having a second axis different from the first axis.

15. The assembly according to claim 14, wherein the first mounting interface defines a first channel and the second mounting interface defines a second channel.

16. The assembly according to claim 15, wherein the first channel is inclined relative to the second channel.

17. A vehicle door comprising:
   an anti-intrusion assembly including at least one reinforcement member and a mounting plate securable to the vehicle door, the mounting plate including a securing feature to secure the mounting plate to the vehicle door and a plurality of mutually inclined contoured mounting interfaces for the at least one reinforcement member, wherein the at least one reinforcement member is mountable to the mounting plate in a plurality of positions.

18. The door according to claim 17, further including a door hinge fixed to the mounting plate.

19. The assembly as recited in claim 1, wherein the plurality of positions comprise a first position and a second position, and the first position is different from the second position.

20. The assembly as recited in claim 5, wherein the plurality of positions comprise a first position and a second position, and the first position is different from the second position.

* * * * *